Sept. 8, 1970     R. G. ZIMMERMAN     3,527,111
PNEUMATIC TOOL
Filed Sept. 24, 1968
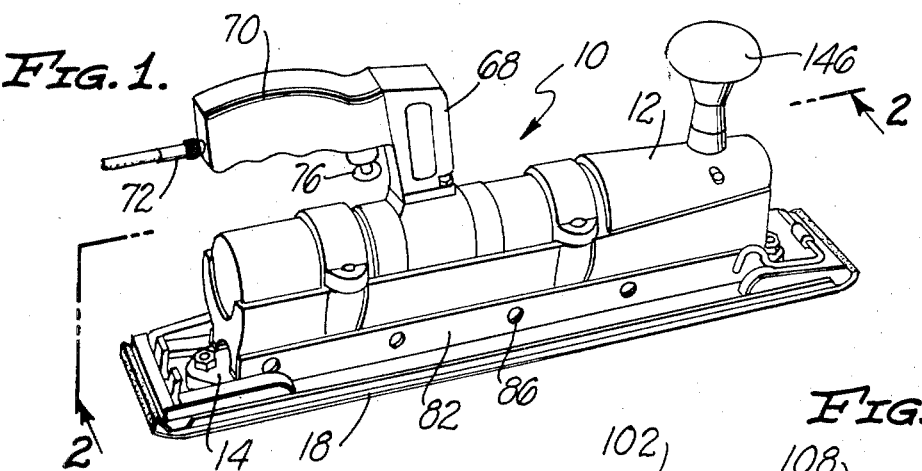
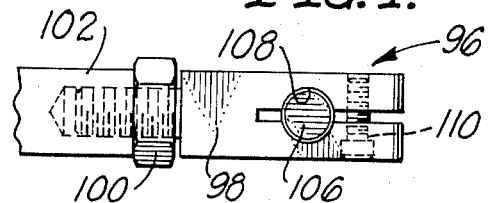
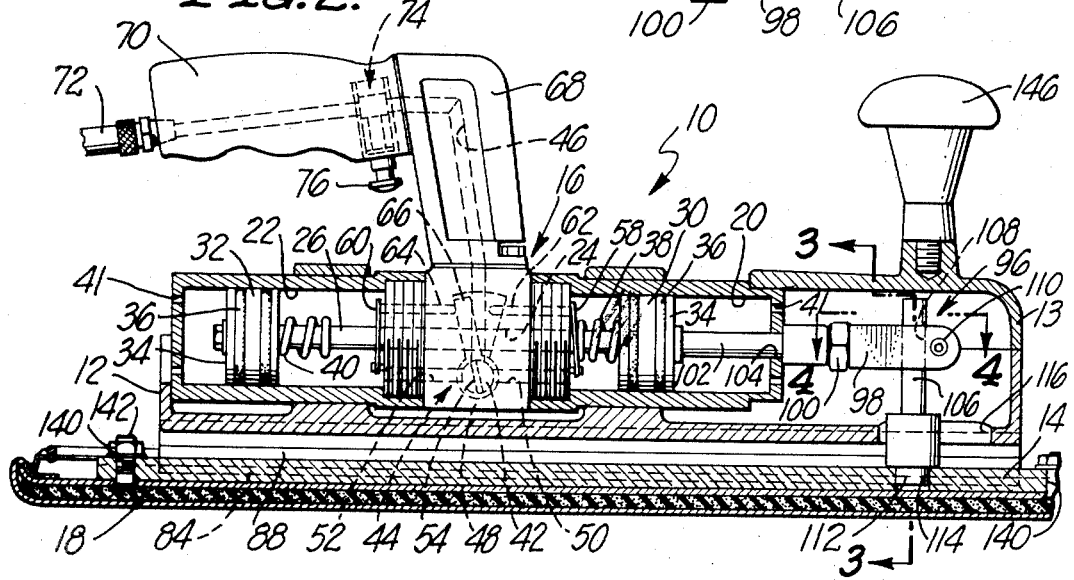
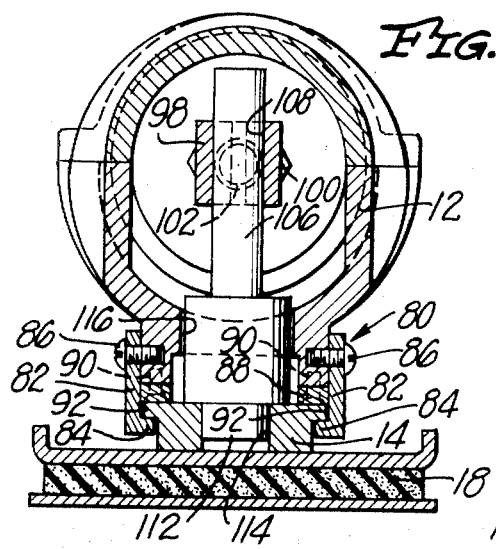
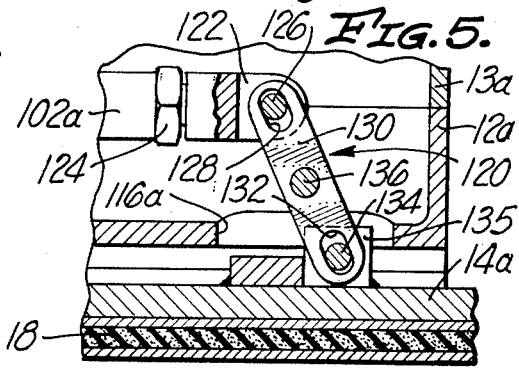
INVENTOR
ROBERT G. ZIMMERMAN
BY HIS ATTORNEYS
HARRIS, KIECH, RUSSELL & KERN

United States Patent Office 3,527,111
Patented Sept. 8, 1970

3,527,111
PNEUMATIC TOOL
Robert G. Zimmerman, Santa Monica, Calif., assignor to Air Speed Tool Company, Los Angeles, Calif., a partnership
Filed Sept. 24, 1968, Ser. No. 761,910
Int. Cl. F16h 21/04
U.S. Cl. 74—110                                    6 Claims

ABSTRACT OF THE DISCLOSURE

A pneumatic tool including a body having aligned cylinders and a bore therebetween, with a piston rod reciprocal within the bore and extending into the cylinders, and with pistons carried by the rod and slidable in the cylinders and forming a piston-and-rod assembly. An oscillating valve mechanism controls the flow of compressed air alternately into and out of the cylinders to reciprocate the piston-and-rod assembly. A tool carrier is supported by the body and guided thereon and is reciprocal relative thereto. Coupling means are provided between the tool carrier and the piston-and-rod assembly for simultaneous movement of the tool carrier and the piston-and-rod assembly in the same or in opposite directions.

---

This invention relates to a pneumatic tool and more specifically to a device which employs pneumatic power to reciprocally drive a tool carried thereby. The device is used principally to reciprocate tools such as a sander, a file, or a saw, but other related uses may be provided and are intended to be within the scope of the invention.

Pneumatic or hydraulic devices are in general use today for reciprocating or otherwise driving tools such as a sander, file, or a saw; however, many of these devices are adaptable only for use with one particular type of tool, such as a saw, and not for others. Moreover, where such devices are adaptable to more than one type of tool, the tool carriage and mounting assemblies are quite complicated and changeover from one type of tool to another is quite time-consuming. Further, where existing tool carriers are supported wholly by a carrier guide means of the device, removal of the guide means will result in complete collapse of the tool carrier assembly. Additionally, the drive assemblies of many devices are complex and oftentimes produce excessive vibration.

I have developed a novel pneumatic tool which eliminates the aforementioned problems. My device is uncomplicated in assembly and provides a tool mounting and tool carrier for easy changeover from one tool to another. The tool carrier is securely assembled to the device and may be carried itself by a coupling assembly as well as a carrier guide means. Additionally, my device provides a means for driving or reciprocating the tool which produces little vibration and also permits the reciprocation of the tool both in and out of phase with the drive means.

More specifically, my device includes an elongated body defining a forward and a rearward cylinder, axially aligned, and a bore therebetween, with a piston rod reciprocal within said bore and extending into each of said cylinders, and with a forward and a rearward piston carried by said rod and slidable in said forward and rearward cylinders, respectively, forming a piston-and-rod assembly. An oscillating valve means controls the flow of compressed air alternately into and out of the cyilnders to reciprocate the piston-and-rod assembly. A tool carrier is supportingly guided by the body member and is adapted to reciprocate relative thereto. Coupling means are provided for coupling the tool carrier to the piston-and-rod assembly whereby the tool carrier is reciprocated simultaneously in the same or in the opposite direction from the piston-and-rod assembly. The tool itself is removably attached to the tool carrier for quick and easy changeover from one tool to another without disassembling any portion of the device itself.

Accordingly, it is an object of my invention to provide a pneumatic device for reciprocating a tool which is easily and quickly assembled and provides an easy and quick changeover from one tool to another.

A further object of my invention is to provide such a device which includes oscillating valve means to control the flow of air into and out of cylinders wherein a piston-and-rod assembly reciprocates.

Another object of my invention is to provide such a device with direct and uncomplicated coupling means between the piston-and-rod assembly and a tool carrier which is supported by a body and which is guided thereon to reciprocate relative thereto. Still another object of my invention is to provide coupling means which permit the tool carrier to reciprocate simultaneously with the piston-and-rod assembly in the same or in the opposite direction. A further object is to provide a securely mounted tool carrier assembly.

The invention, both as to its organization and method of operation, together with further objects and advantages thereof, may best be understood by reference to the following description taken in connection with the accompanying drawing.

In the drawing:

FIG. 1 is an isometric view of my device;

FIG. 2 is an enlarged sectional view taken along the line 2—2 in FIG. 1;

FIG. 3 is an enlarged sectional view taken along the line 3—3 in FIG. 2;

FIG. 4 is an enlarged fragmentary sectional view taken along the line 4—4 in FIG. 2; and FIG. 5 is an enlarged fragmentary sectional view of another embodiment of the coupling means of my invention.

Referring now to the drawing, my device, which is indicated by the reference numeral 10, includes an elongated body member 12 and a tool carrier 14 reciprocally mounted thereto. The tool carrier 14 is preferably driven by a pneumatic drive means 16 or other such means and is adapted to carry a tool 18, for example, a sander as indicated. Although a sander is shown as exemplary of the tool, other tools may be employed, such as a file or a saw, and all such tools and related uses are intended to be within the scope of the invention.

More particularly, the body member 12 includes a forward cylinder 20 and a rearward cylinder 22, preferably axially aligned, with a connecting bore 24 therebetween and preferably in axial alignment with the cylinders. A piston rod 26 is received within the bore 24 to reciprocate therein and extends into the cylinders 20 and 22. A forward piston 30 and a rearward piston 32 are suitably carried by the piston rod 26 and are adapted to slide within the cylinders 20 and 22, respectively. The pistons 30 and 32 with the piston rod 26 form a piston-and-rod assembly. The pistons 30 and 32 may also include backing discs 34 with washers 36 if necessary. Carried inwardly of the pistons 30 and 32 on rod 26 are coil springs 38 and 40. The piston-and-rod assembly is adapted to reciprocate within the bore 24 and the cylinders 20 and 22 and is driven by the pneumatic drive means 16. The cylinders 20 and 22 may include vent holes 41 in their outer faces.

The pneumatic drive means 16 is a snap-action drive means which includes an air chamber 42 in the body 12 and an oscillating valve means or mechanism 44. An air inlet passage 46 communicates with the air chamber 42 and is used to supply the air chamber with compressed air. An outlet or exhaust passage 48 connects the air chamber 42 with the atmosphere while ducts 50 and 52 connect the air chamber with cylinders 20 and 22, respectively. A valve element 54 of the valve means 44 is adapted to oscillate between two positions to permit air to flow alternately into and out of the cylinders 20 and 22 to reciprocate the piston-and-rod assembly.

The oscillating valve means 44 is provided with a snap action for quick and efficient reciprocation of the piston-and-rod assembly. The snap action is produced by the alternate action of the coil springs 38 and 40 on pivoted actuator levers 58 and 60 mounted on the inner ends of the cylinders 20 and 22, respectively. The actuator levers are attached to slidable plungers 62 and 64 which engage a radial arm 66 extending axially from the valve element 54.

The body member 12 may be provided with a handle 68 with a pistol grip 70 which may include a connection for a lead line 72 to the source of compressed air (not shown). Preferably a valve means 74 is provided in the pistol grip of the handle 68 and includes a thrust button member 76 to control the flow of air from the line 72 into the air inlet passage 46 to the oscillating valve means 44.

In operation, air is allowed to flow through the inlet passage 46 to the chamber 42 where the valve element 54 permits its passage alternately into cylinders 20 and 22 by means of the ducts 50 and 52. As one chamber is receiving the compressed air, the other chamber is exhausting through the respective duct and thence through the exhaust passage 48 to the atmosphere. The valve element 54 may be biased or releasably held in each of its two positions, for example, by a detent means (not shown).

As the respective cylinder exhausts its air and as the piston moves toward the inner end of the cylinder, the respective coil springs 38 or 40 presses against the actuator lever 58 or 60 and acts against the holding action of the valve element 54 and eventually snaps the lever with the attached plunger 62 or 64 inwardly to flip the radial arm 66 to the opposite side, thereby moving the valve element 54 to its alternate position to permit the compressed air to enter the other cylinder. The piston-and-rod assembly will continue to reciprocate in this manner until the supply of compressed air is shut off from its source by means of the button 76 and valve means 74 of the handle member 68.

The piston-and-rod assembly is used to drive the tool carrier 14 and preferably the tool carrier is driven by a single connection. The tool carrier 14 is adapted to reciprocate longitudinally of the body member 12. Where, for example, a sander 18 is used, or a file member (not shown), it is preferable to carry the tool beneath the body member 12 to permit pressure to be applied by the user or operator upon the surface to be sanded or filed. The tool carrier 14 is supported by the body 12 and is guided thereon by guide means 80 which are attached to the body 12 (FIG. 3).

The guide means 80 includes a pair of elongated carrier guides 82 which are attached, as by screws 86, to the body 12 and extend longitudinally of the body. The guides 82 are L-shaped and include inwardly projecting portions 84 which extend the length thereof. Twin bearing members 88 are provided for the guide means 80 and are attached, as by screws 90, to the body 12 and are spaced above the inwardly extending portions 84 of the guides 82. The carrier member 14 includes outwardly protruding longitudinal flange members 92 which are adapted to ride within the carrier guide means 80 between the bearing members 88 and the inwardly projecting portions 84 of the carrier guides 82. The tool carrier 14 therefore is mounted to reciprocate longitudinally of the body member 12 and is guided thereon by the guide means 80.

The tool carrier 14 is reciprocally driven by the pneumatic drive means 16 and is coupled to the piston-and-rod assembly by a coupling means 96 (FIG. 2). In the preferred embodiment, the tool carrier 14 is reciprocated simultaneously with the piston-and-rod assembly in the same direction. As shown, the coupling means 96 is preferably attached at the forward end of the piston-and-rod assembly and is mounted within an enclosed front portion 13 of the body 12; however, it could be attached at the rearward end or both and such connections are intended to be within the scope of the invention. The coupling means 96 may include a connector member or clevis 98 which is attached by a connector jam nut 100 to an axial extension 102 of the piston rod 26. The piston rod extension 102 is adapted to slidably move in a bore 104 in the forward face of the cylinder 20. A drive pin 106 extends downwardly from the clevis 98 and is adapted to be rigidly attached to the clevis within a bore 108 by means of a tightening screw 110 (FIG. 4). The drive pin 106 has a circular protrusion 112 at the base thereof which is adapted to snugly fit within a circular opening 114 in the tool carrier 14. As the piston-and-rod assembly reciprocates, the tool carrier 14 reciprocates simultaneously in the same direction. The drive pin 106 is adapted to move within an opening 116 in the bottom of the front portion 13 of the body member 12.

In the preferred embodiment, the engagement between the circular protrusion 112 of the drive pin 106 and the opening 114 of the tool carrier 14 is sufficiently close that the tool carrier 14 may itself be carried or supported by the drive pin 106. If the guides 82 of the guide means 80 were to be removed, then, the tool carrier assembly would not completely collapse or fall apart. My device is therefore more securely assembled than the devices presently in use, since such a removal of the currently employed guides would also disengage the carriers from the body members.

In an alternate embodiment, as shown in FIG. 5, a coupling means 120 drives a tool carrier 14a simultaneously in the opposite direction to the piston-and-rod assembly. The coupling means 120 is preferably attached to the forward end of the piston-and-rod assembly; however, it may be attached to the rearward end, or both, as with the coupling means 96. The coupling means 120 is mounted within an enclosed front portion 13a of a body 12a and includes a connector member or clevis 122 which is connected by a jam nut 124 to a rod extension 102a. The clevis 122 includes a pivot pin 126 which is adapted to be received in a slot 128 in a lever 130. The lever 130 includes a similar slot 132 at its opposite end to receive a pivot pin 134 which extends from a protruding portion 135 of the tool carrier 14a. The lever 130 is fulcrumed at a fulcrum pin 136 which is suitably attached to the body member 12a and is positioned intermediate, preferably directly between, the pins 126 and 134. The lever 130 will move in an opening 116a in the bottom of the front portion 13a of the body 12a. As can be seen, therefore, as the piston-and-rod assembly moves in one direction, the lever drives the tool carrier 14a in the opposite direction so that the tool carrier and the piston-and-rod assembly reciprocate simultaneously in opposite directions, producing a reverse vibration effect from that produced by the coupling means 96.

The tool carrier 14 or 14a is adapted to carry the tool 18, or any other such member, and for this purpose preferably includes openings 140 at both ends thereof which may receive bolts or screws 142 of the tool 18 or other similar implement. It is not necessary to disassemble the entire device 10 to change tools but the tools are easily and quickly mounted to and detached from the carrier 14 or 14a as indicated. The tool carriers 14 and 14a are reciprocated by the direct coupling means 96 or 120 to one end of the piston-and-rod assembly and there is no lost motion between this assembly and the carrier. Because of the simple and direct coupling 96 or 120 and because of the guide means 80 to mount and guide the tool carriers on the body, vibration of the device is reduced to a minimum. The device may be held by one hand by the handle 68 with its pistol grip 70 or by two hands with an additional hand grip 146 suitably attached at the forward end of the body member 12. Control of the operation of the device is easily maintained by the operator through the valve means 74 in the handle 68.

Although I have described in some detail exemplary embodiments of my invention, changes, modifications, and substitutions may be made therein without departing from the spirit of the invention. I therefore intend that my invention be limited in scope only by the terms of the following claims.

I claim:

1. A pneumatic device, comprising in combination:
   an elongated body including means defining a cylinder, with a piston and rod reciprocal within said cylinder;
   pneumatic drive means for reciprocally driving said piston and rod within said body;
   a tool carrier;
   guide means removably mounted on opposing sides of said body for supporting said tool carrier in reciprocating engagement with said body; and
   coupling means joining said tool carrier to said rod for driving and supporting said carrier, with said coupling means supporting said tool carrier when said guide means are removed from said body.

2. A pneumatic device as defined in claim 1 wherein said coupling means includes means for reciprocating said rod and said tool carrier simultaneously in the same direction.

3. A pneumatic device as defined in claim 1 wherein said coupling means includes means for reciprocating said tool carrier and said rod simultaneously in opposite directions.

4. A pneumatic device as defined in claim 1 wherein said guide means includes a pair of elongated, spaced-apart guide members, each with an inwardly protruding lower leg portion, and a pair of elongated bearing members each spaced parallel to and above one of said leg portions, said tool carrier including opposed flange members slidably receivable between said bearing members and said leg portions, and wherein said coupling means includes means for reciprocating said rod and said tool carrier simultaneously in the same direction including an elongated connector member mounted to and extending axially from said rod, a drive pin connected to and extending transversely from said connector member, and means on said tool carrier fixed to said pin.

5. A pneumatic device, comprising in combination:
   an elongated body including means defining a cylinder, with a piston and rod reciprocal within said cylinder;
   pneumatic drive means for reciprocally driving said piston and rod within said body;
   a tool carrier;
   guide means on said body for supporting said tool carrier in reciprocating engagement with said body; and
   coupling means for coupling said tool carrier to said rod for driving said carrier,
   said coupling means including means for reciprocating said rod and said tool carrier simultaneously in the same direction and comprising an elongated connector member mounted to and extending axially from said rod, a drive pin connected to and extending transversely from said connector member, and means on said tool carrier for receiving said pin.

6. A pneumatic device, comprising in combination:
   an elongated body including means defining a cylinder, with a piston and rod reciprocal within said cylinder;
   pneumatic drive means for reciprocally driving said piston and rod within said body;
   a tool carrier;
   guide means on said body for supporting said tool carrier in reciprocating engagement with said body; and
   coupling means for coupling said tool carrier to said rod for driving said carrier,
   said coupling means including means for reciprocating said tool carrier and said rod simultaneously in opposite directions and comprising an elongated connector member mounted to and extending axially from said rod and a lever pivotally mounted to said connector member and said tool carrier and fulcrumed on said body about a point intermediate thereof.

References Cited
UNITED STATES PATENTS

| | | | |
|---|---|---|---|
| 2,970,488 | 2/1961 | Skillings | 74—110 |
| 3,108,409 | 10/1963 | Hendrickson | 51—170.3 |
| 3,145,449 | 8/1964 | Johnson et al. | 51—170.3 |
| 3,214,823 | 11/1965 | Hendrickson | 51—170.3 |

WESLEY S. RATLIFF, JR., Primary Examiner

U.S. Cl. X.R.

51—170.3